United States Patent
Zou et al.

(10) Patent No.: US 9,886,790 B2
(45) Date of Patent: Feb. 6, 2018

(54) SYSTEM AND METHOD OF SHADOW EFFECT GENERATION FOR CONCAVE OBJECTS WITH DYNAMIC LIGHTING IN THREE-DIMENSIONAL GRAPHICS

(71) Applicant: Robert Bosch GmbH, Stuttgart (DE)

(72) Inventors: Lincan Zou, San Jose, CA (US); Liu Ren, Cupertino, CA (US)

(73) Assignee: Robert Bosch GmbH, Stuttgart (DE)

(*) Notice: Subject to any disclaimer, the term of this patent is extended or adjusted under 35 U.S.C. 154(b) by 41 days.

(21) Appl. No.: 15/197,990

(22) Filed: Jun. 30, 2016

(65) Prior Publication Data

US 2016/0307363 A1 Oct. 20, 2016

Related U.S. Application Data

(63) Continuation of application No. PCT/US2015/068226, filed on Dec. 31, 2015, which is a continuation-in-part of application No. 13/828,772, filed on Mar. 14, 2013, now Pat. No. 9,792,724.

(60) Provisional application No. 62/171,459, filed on Jun. 5, 2015, provisional application No. 62/098,668, filed on Dec. 31, 2014.

(51) Int. Cl.
*G06T 15/60* (2006.01)
*G06T 15/00* (2011.01)

(52) U.S. Cl.
CPC ............ *G06T 15/60* (2013.01); *G06T 15/005* (2013.01)

(58) Field of Classification Search
None
See application file for complete search history.

(56) References Cited

U.S. PATENT DOCUMENTS

| | | |
|---|---|---|
| 5,808,620 A | 9/1998 | Doi et al. |
| 6,437,782 B1 | 8/2002 | Pieragostini et al. |
| 6,583,884 B2 | 6/2003 | Rudd et al. |
| 7,212,206 B2 | 5/2007 | Green |
| 7,242,408 B1 | 7/2007 | Dunn |
| 8,379,021 B1 | 2/2013 | Miller et al. |

(Continued)

FOREIGN PATENT DOCUMENTS

| | | |
|---|---|---|
| EP | 0702333 A2 | 3/1996 |
| JP | H0896161 A | 4/1996 |

(Continued)

OTHER PUBLICATIONS

Supplementary Partial European Search Report Corresponding to European Patent Application 14775082 (7 pages).
International Search Reporting and Written Opinion Corresponding to PCT Application No. PCT/US2015/068226, dated May 25, 2016 (12 pages).

(Continued)

*Primary Examiner* — Kee M Tung
*Assistant Examiner* — Xin Sheng
(74) *Attorney, Agent, or Firm* — Maginot Moore & Beck LLP (57) ABSTRACT

A method of generating three-dimensional graphics enables the generation of performance and quality balanced sun position sensitive soft shadows for objects including three-dimensional models of buildings. The method includes identification of both convex and concave object shapes for the generation of the soft shadow meshes and the modification of the soft shadow meshes based on the position of a light source in a three-dimensional virtual environment to generate realistic shadow graphics including shadows that change shape in response to movement of the light source.

10 Claims, 11 Drawing Sheets

(56) References Cited

U.S. PATENT DOCUMENTS

| | | | |
|---|---|---|---|
| 8,436,855 B1 | 5/2013 | Morgan et al. |
| 8,855,388 B2 | 10/2014 | Wehnes et al. |
| 2003/0112237 A1 | 6/2003 | Corbetta |
| 2006/0152503 A1 | 7/2006 | Lee et al. |
| 2011/0043523 A1 | 2/2011 | Kim et al. |
| 2011/0128558 A1 | 6/2011 | Stevens et al. |
| 2014/0176546 A1 | 6/2014 | Hart |
| 2014/0267248 A1 | 9/2014 | Lou et al. |

FOREIGN PATENT DOCUMENTS

| | | |
|---|---|---|
| JP | 3152820 B2 | 4/2001 |
| KR | 10-0896137 B1 | 5/2009 |

OTHER PUBLICATIONS

Chan, "Optimal output-sensitive convex hull algorithms in two and three dimensions", Discrete and Computational Geometry, 1996, pp. 361-368, vol. 16, Springer-Verlag, Canada (8 pages).

Crow, "Shadow algorithims for computer graphics", Computer Graphics, 11, 2 (Proceedings of ACM SIGGRAPH 77), 1977, pp. 242-248, Austin, USA (7 pages).

Shanmugam et al., Hardware accelerated ambient occlusion techniques on GPUs, In Proceedings of I3D (2007), 2007, pp. 73-80, ACM, Austin, USA (8 pages).

Williams, "Casting curved shadows on curved surfaces," Computer Graphics, 12, 3 (Proceedings of ACM SIGGRAPH 78), 1978, pp. 270-274, Westbury, USA (5 pages).

Thirion, 'Realistic 3D simulation of shapes and shadows for image processing;' [Research Report] RR-1344, 1990. <inria-00075215>; https://hal.inria.fr/inria-00075215; published Nov. 1990; available online May 2006 (25 pages).

Chin et al.; "Near Real-Time Shadow Generation Using BSP Trees;" ACM; Computer Graphics, vol. 23, No. 3, pp. 99-106, Jul. 1989.

Lischinski et al.; "Combining Hierarchical Radiosity and Discontinuity Meshing;" ACM; Computer Graphics, vol. 27, No. 3, pp. 199-208, Aug. 1993.

Soler-Bientz et al.; Developing a Computational Tool to Assess Shadow Pattern on a Horizontal Plane, Preliminary Results; pp. 002312-002317; 35th IEEE Photovoltaic Specialists Conference (PVSC), Jun. 2010.

FRUEH et al.; "Automated Texture Mapping of 3D City Models With Oblique Aerial Imagery;" Proceedings of the 2nd International Symposium on 3D Data Processing, Visualization, and Transmission (3DPVT'04); Aug. 2004 (8 pages).

Bala et al.; "Combining Edges and Points for Interactive Anti-Aliased Rendering;" Cornell University Program of Computer Graphics Technical Report: PCG-02-3, Jan. 2002; (11 pages).

SYSTEM AND METHOD OF SHADOW EFFECT GENERATION FOR CONCAVE OBJECTS WITH DYNAMIC LIGHTING IN THREE-DIMENSIONAL GRAPHICS

CLAIM OF PRIORITY

This application is a continuation in part of and claims priority to U.S. Non-Provisional application Ser. No. 13/828,772, which is entitled "System And Method For Generation Of Shadow Effects In Three-Dimensional Graphics," and was filed on Mar. 14, 2013, the entire contents of which are hereby incorporated by reference herein. This application is a continuation of and claims priority to Patent Cooperation Treaty (PCT) Application No. PCT/US2015/068226, which is entitled "System and Method of Shadow Effect Generation for Concave Objects with Dynamic Lighting in Three-Dimensional Graphics," and was filed on Dec. 31, 2015, the entire contents of which are hereby incorporated by reference herein. This application claims further priority to U.S. Provisional Application No. 62/098,668, which is entitled "System And Method Of Shadow Effect Generation For Concave Objects With Dynamic Lighting In Three-Dimensional Graphics," and was filed on Dec. 31, 2014, the entire contents of which are hereby incorporated by reference herein. This application claims further priority to U.S. Provisional Application No. 62/171,459, which is entitled "System And Method Of Shadow Effect Generation For Concave Objects With Dynamic Lighting In Three-Dimensional Graphics," and was filed on Jun. 5, 2015, the entire contents of which are hereby incorporated by reference herein.

FIELD

This disclosure relates generally to the field of computer graphics and, more specifically, to systems and methods for generating shadow effects in three-dimensional computer graphics.

BACKGROUND

Many modern software applications display three-dimensional representations of objects and scenes as part of a user interface. Three-dimensional (3D) graphics are used in a wide range of applications including video games, simulations, virtual reality applications, geospatial information applications, and applications for mapping and navigation. In many applications, 3D graphics are more useful than two-dimensional (2D) graphics at depicting real-world environments and locations because the normal interaction between humans and the real-world occurs in three dimensions. The 3D graphics are typically generated with multiple polygons that form the shapes of objects and other structures in a 3D virtual environment. Modern 3D graphics also include numerous graphical effects including, but not limited to, lighting effects, texturing, and shadow effects that a processor applies to the polygons to display the 3D environment. Modern processors use both central processing units (CPUs) and graphical processing units (GPUs) as hardware that performs the processing required to execute software programs that implement a 3D application programming interface (API), with OpenGL, OpenGL ES, Vulkan, Metal, and different versions of Direct 3D being examples of APIs that are commonly used in the art.

Figure 7:
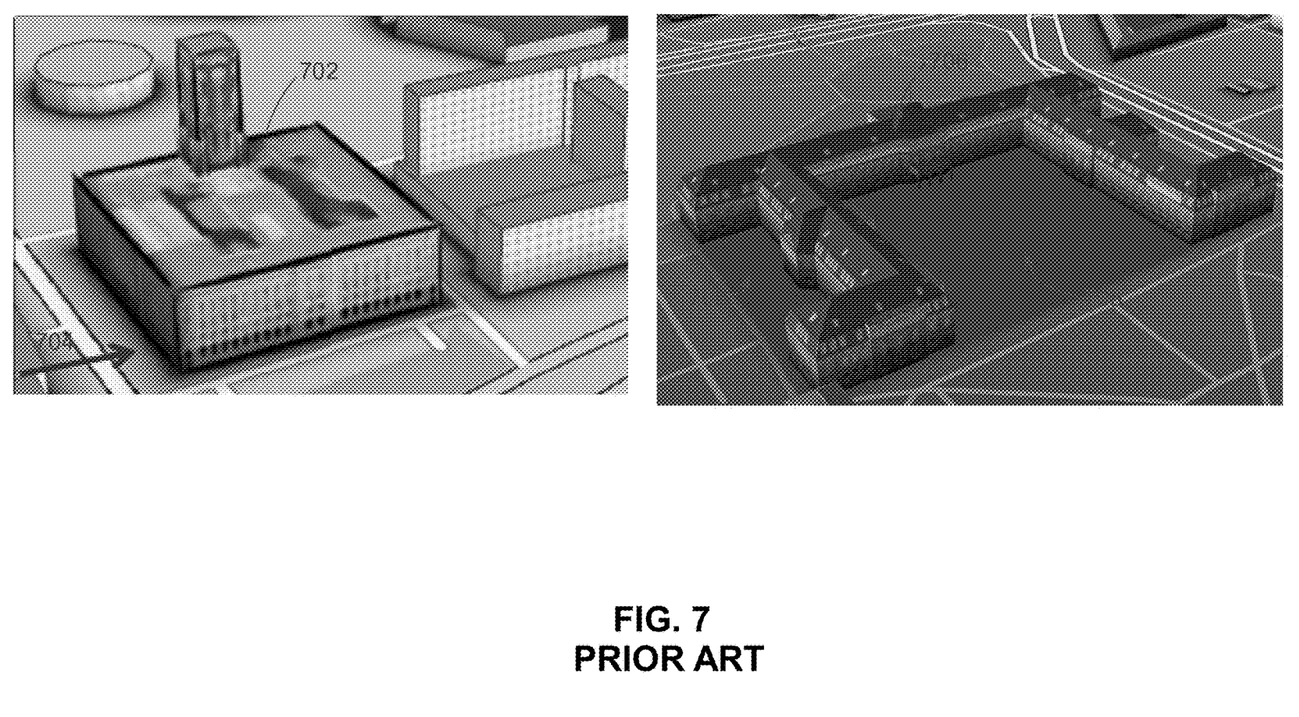
FIG. 7 is a diagram of a 3D virtual environment that is generated using a prior art shadow generation technique.

Many 3D hardware and software applications generate graphics of shadows to provide 3D perception for objects visualized in 3D scenes. Existing techniques for shadow effects simulation including shadow volumes, and shadow maps that generate shadow effects with varying degrees of realism. However, these prior art methods are computationally intensive and are often not suitable for low power embedded devices. Another prior art solution for soft shadow effects simulation on embedded devices generates high quality real-time soft shadow effects with reduced memory utilization through the generation of shadow polygons around objects in the 3D environment, such as building. However, this prior art method only works for 3D objects with convex footprints. For example, FIG. 7 depicts the prior art shadow generation system that produces an accurate shadow 704 along a wall of a convex building model 702, but produces inaccurate shadows that cover a courtyard and other outdoor regions 708 around a building model 706 that is formed with a concave structure. The term "concave" refers to an object with one or more vertices that are located within a convex perimeter polygon forms a "footprint" around the base of the object at ground level in a 3D virtual environment. A processor generates the convex footprint polygon using a convex hull or other suitable convex perimeter process. The concave structure leads to the graphical artifacts depicted in FIG. 7 where a ground shadow or light effect is improperly applied to regions of the convex footprint for the object that lie outside of some concave exterior surfaces of the object. The generated shadows in the prior art techniques also have no relation with the position of a light source in the 3D virtual environment, such as the position of the sun in a 3D virtual environment that depicts a geographic region in a mapping and navigation application program. Consequently, improved techniques for rendering accurate shadows in 3D scenes for concave objects and for adjusting shadows based on the positions of light sources in an efficient manner would be beneficial.

SUMMARY

A method of generating three-dimensional graphics enables the generation of quality balanced sun position sensitive soft shadow and lighting effects for objects including three-dimensional models of buildings. The method includes identification of both convex and concave object shapes for the generation of the soft shadow maps and the modification of the soft shadow maps based on the position of a light source in a three-dimensional virtual environments to generate realistic shadow graphics including shadows that change shape in response to movement of the light source.

In one embodiment, a method for generating computer graphics with soft shadow effects has been developed. The method includes identifying with a processor a plurality of vertices in a footprint of a structure in a three-dimensional virtual environment, generating with the processor a concave hull including the plurality of vertices in the footprint of the structure, generating with the processor a soft shadow mesh extending outward from each vertex in the concave hull onto a surface in the three-dimensional virtual environment from a base of the structure, applying with the processor a lighting texture to the soft shadow mesh, and generating with the processor and a display device a depiction of the structure and the soft shadow mesh with the applied lighting texture in the three-dimensional virtual environment. The generation of the concave hull further includes identifying with the processor a first vertex and a second vertex in the plurality of vertices located on a convex hull formed around the plurality of vertices in the footprint, performing with the processor a breadth-first search to identify a third vertex in the plurality of vertices located between the first vertex and the second vertex and not located on the convex hull, and generating with the processor the concave hull including the first vertex, the second vertex, and the third vertex.

In another embodiment, a graphical display system includes a display device, a memory, and a processor operatively connected to the display device and the memory. The processor is configured to identify a plurality of vertices in a footprint of a structure in a three-dimensional virtual environment with reference to polygon data stored in the memory, generate a concave hull including the plurality of vertices in the footprint of the structure, generate a soft shadow mesh extending outward from each vertex in the concave hull onto a surface in the three-dimensional virtual environment from a base of the structure, apply a lighting texture stored in the memory to the soft shadow mesh, and generate a depiction of the structure and the soft shadow mesh with the applied lighting texture in the three-dimensional virtual environment using the display device. For generation of the concave hull, the processor is further configured to identify a first vertex and a second vertex in the plurality of vertices located on a convex hull formed around the plurality of vertices in the footprint, perform a breadth-first search to identify a third vertex in the plurality of vertices located between the first vertex and the second vertex and not located on the convex hull, and generate the concave hull including the first vertex, the second vertex, and the third vertex.

DETAILED DESCRIPTION

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the term "texture" refers to any graphical image or images that are mapped to one or more polygons in a three-dimensional display to alter the appearance of the polygons in a graphical display. As used herein, the term "lighting texture" refers to textures that affect the perceived brightness, darkness, or color shading of a polygon in the graphical display. As used herein, the term "shadow texture" refers to a type of lighting texture that darkens the appearance of a polygon in a similar manner to a shadow that darkens an appearance of an object in the physical world. As used herein, the term "highlight texture" refers to a texture that brightens the appearance of a polygon in a similar manner to how lights shining on an object brighten an appearance of the object in the physical world. In addition to standard shadow and highlight textures, other lighting texture effects change the perceived display of three-dimensional polygons in a display. For example, lighting textures include pencil hatching shading and oil-painting effects that are applied on and around a three-dimensional model to achieve a predetermined aesthetic effect. As is known in the art, one texture or multiple textures can be applied to a polygon using, for example, texture mapping techniques that are specified in the OpenGL and Direct 3D standards.

As used herein, the term "object" refers to data that correspond to a plurality of vertices that form polygons in a virtual environment to depict a model of a single object in the larger virtual environment. As used herein, the term "structure" refers to an object with polygons that are positioned and oriented in the 3D virtual environment to stand on a virtual representation of ground or the surface of the earth. Common examples of structures include representations of manmade objects such as buildings, bridges, monuments, and other artificial constructions. Natural structures include representations of trees and vegetation, cliffs, rock outcroppings, and other objects that correspond to natural features.

Structures in a 3D virtual environment extend from a surface of the virtual representation of the ground. The polygons that define each structure provide a shape for the structure, and the structure is also oriented in a predetermined manner to emerge from the ground in an expected manner. In one embodiment of a computing device using software and hardware that is compatible with the OpenGL 3D graphics standard, the orientation of a structure is specified using a rotational matrix to orient the structure with the base of the structure engaging the ground and other polygons in the structure extending from the ground. For example, a 3D object representing a building includes a base that corresponds to the foundation of the building engaging the ground in the virtual environment. The polygons in the structure that extend upward from the ground are referred to as "walls," although the polygons do not necessarily have to depict walls of a building. As used herein, the term "base" as applied to a structure refers to the locations of polygon vertices in the structure model that correspond to the outermost coordinates for each polygon from a center of the structure as viewed from overhead in the same manner as in a conventional two-dimensional map. For example, if the structure is a simple cube, then the base is defined by the locations of the four bottom corners of the cube as viewed from above. The base in some structure models corresponds to the location where the structure meets the ground, such as the foundation in many buildings. In some structure models, however, the base includes polygon vertices that are above the ground level, such as structures that are formed with overhangs and other projections that extend from the center of the building as viewed from above, but do not contact the ground.

Figure 1:
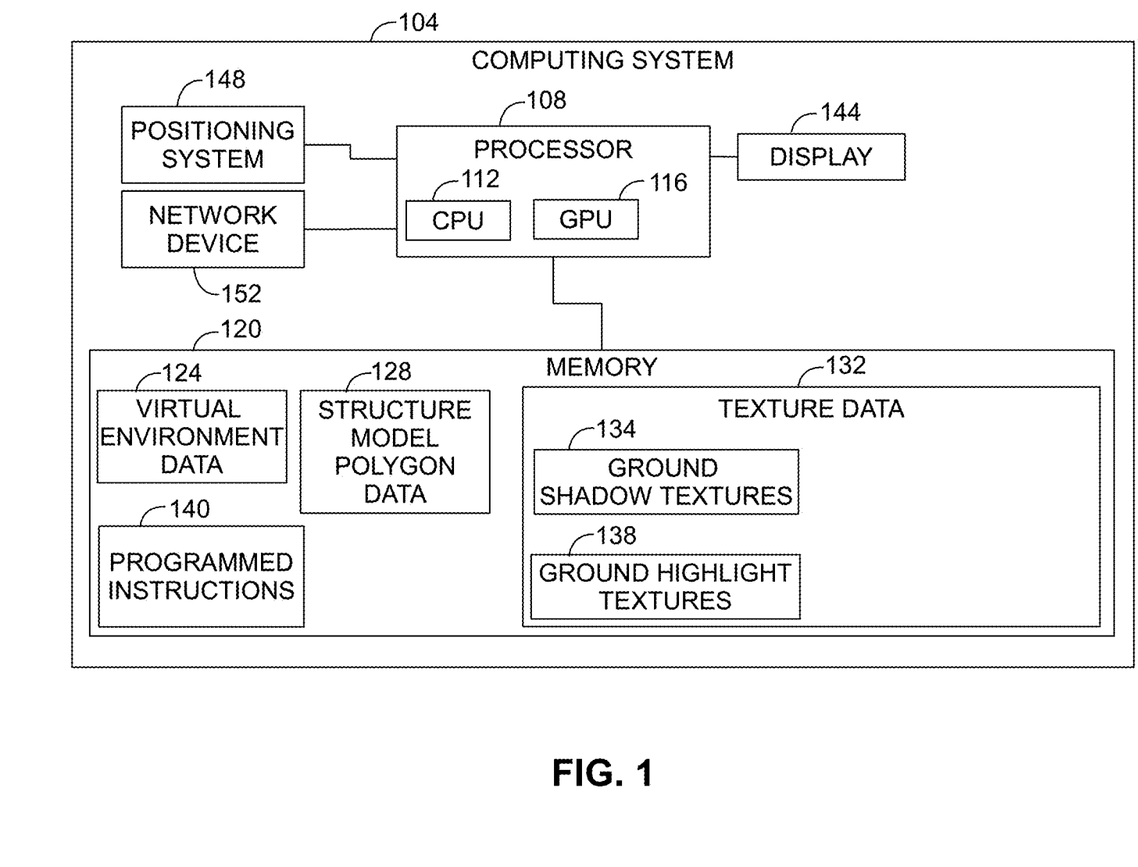
FIG. 1 is a schematic diagram of a computing device that is configured to generate three-dimensional (3D) graphics including ground shadows and wall shadows generated on graphical representations of 3D structures in a virtual environment.

FIG. 1 depicts a computing system 104 that generates a graphical display of a 3D virtual environment including a representation of a ground surface, such as the surface of the Earth, with ground lighting textures or shadow textures applied to the regions surrounding the structures and to the polygons that depict walls of the structures. The computing system 104 includes a processor 108, memory 120, display 144, optional positioning system 148, and optional network device 152. Hardware embodiments of the computing system 104 include, but are not limited to, personal computer (PC) hardware, embedded system hardware including embedded computing hardware for use in a motor vehicle, and mobile electronic devices including smartphone and tablet computing devices.

In the computing system 104, the processor 108 includes one or more integrated circuits that implement the functionality of a central processing unit (CPU) 112 and graphics processing unit (GPU) 116. In some embodiments, the processor is a system on a chip (SoC) that integrates the functionality of the CPU 112 and GPU 116, and optionally other components including the memory 120, network device 152, and positioning system 148, into a single integrated device. In one embodiment, the CPU is a commercially available central processing device that implements an instruction set such as one of the x86, ARM, Power, or MIPs instruction set families. The GPU includes hardware and software for display of both 2D and 3D graphics. In one embodiment, processor 108 executes software drivers and includes hardware functionality in the GPU 116 to generate 3D graphics using the OpenGL, OpenGL ES, or Direct3D graphics application programming interfaces (APIs). For example, the GPU 116 includes one or more hardware execution units that implement fragment shaders and vertex shaders for the processing and display of 2D and 3D graphics. During operation, the CPU 112 and GPU 116 execute stored programmed instructions 140 that are retrieved from the memory 120. In one embodiment, the stored programmed instructions 140 include operating system software and one or more software application programs that generate 3D graphics, including mapping and navigation applications, virtual reality applications, game applications, simulation applications, and any other software that is configured to generate 3D graphics. The processor 108 executes the mapping and navigation program and generates 2D and 3D graphical output corresponding to maps and map features through the display device 144. The processor is configured with software and hardware functionality by storing programmed instructions in one or memories operatively connected to the processor and by operatively connecting the hardware functionality to the processor and/or other electronic, electromechanical, or mechanical components to provide data from sensors or data sources to enable the processor to implement the processes and system embodiments discussed below.

The memory 120 includes both non-volatile memory and volatile memory. The non-volatile memory includes solid-state memories, such as NAND flash memory, magnetic and optical storage media, or any other suitable data storage device that retains data when the computing system 104 is deactivated or loses electrical power. The volatile memory includes static and dynamic random access memory (RAM) that stores software and data, including graphics data and map feature data, during operation of the computing system 104. In addition to the programmed instructions 140, the memory 120 includes virtual environment data 124, structure model polygon data 128, and texture data 132. The virtual environment data 124 includes a model of a virtual environment include ground terrain information, coordinates and orientation data for multiple 3D objects that are located in the virtual environment, and additional environmental data including virtual lighting sources that illuminate the virtual environment. The structure model polygon data 128 include a plurality of models for three-dimensional structures that are formed from multiple polygons. The data include vertices with three-dimensional coordinates that define a series of interconnected polygons, such as triangles, that form the shape of a structure in the 3D virtual environment. The processor 108 is configured to adjust the relative size and orientation of the each structure model to place the model in the 3D virtual environment, and a 3D virtual environment can include many copies and variations of a single structure model.

In the memory 120, the texture data 132 include a plurality of textures, which are typically 2D images, mapped to the surfaces of the structures in the 3D virtual environment to provide more realistic appearances to the polygon structure models. The texture data 132 also stores light textures including ground shadow textures 134 and ground highlight textures 138. The ground shadow textures 134 are used to darken areas around the bases of structures in the 3D virtual environment, while the ground highlight textures 138 are used to brighten areas around the bases of the structures.

The computing system 104 includes an optional network device 152 that is configured to send and receive data from external computing systems through a data network (not shown). Examples of the network device 152 include wired network adapters such as Ethernet and universal serial bus (USB) adapters, and wireless network adapters such as 3G or 4G wireless wide area network (WWAN), 802.11 or Bluetooth wireless local area network (WLAN) adapters. In some embodiments, the processor 108 retrieves virtual environment data 124, structure model polygon data 128, and texture data 132 from an external network for storage in the memory 120. In some embodiments, the memory 120 caches the graphics data and the processor 108 stores additional graphical data that is received through the network device 152 to update the contents of the memory 120.

The computing system 104 includes an optional positioning system device 148 that is operatively connected to the processor 108. Examples of positioning systems include global positioning system (GPS) receivers, radio triangulation receivers that identify a location of the computing system 104 with respect to fixed wireless transmitters, and inertial navigation systems. During operation, the processor 108 executes mapping and navigation software applications that retrieve location information from the positioning system 148 to identify a geographic location of the computing system 104 and to adjust the display of the virtual environment to correspond to the location of the computing system 104. In navigation applications, the processor 108 identifies the location and movement of the computing system 104 for the generation of routes to selected destinations and display of the routes in the 3D virtual environment.

In the computing system 104, the display 144 is either an integrated display device, such as an LCD or other display device, which is integrated with a housing of the computing system 104, or the display 144 is an external display device that is operatively connected to the computing system 104 through a wired or wireless interface to receive output signals from the processor 108 to generate a display of the 3D virtual environment. In an embodiment where the computing system 104 is an in-vehicle embedded computing device, the display 144 is an LCD or other flat panel display that is located in the console of a vehicle, or the display 144 is a head-up display (HUD) or other projection display that displays the 3D virtual environment on a windshield or other display surface in the vehicle.

Figure 2A:
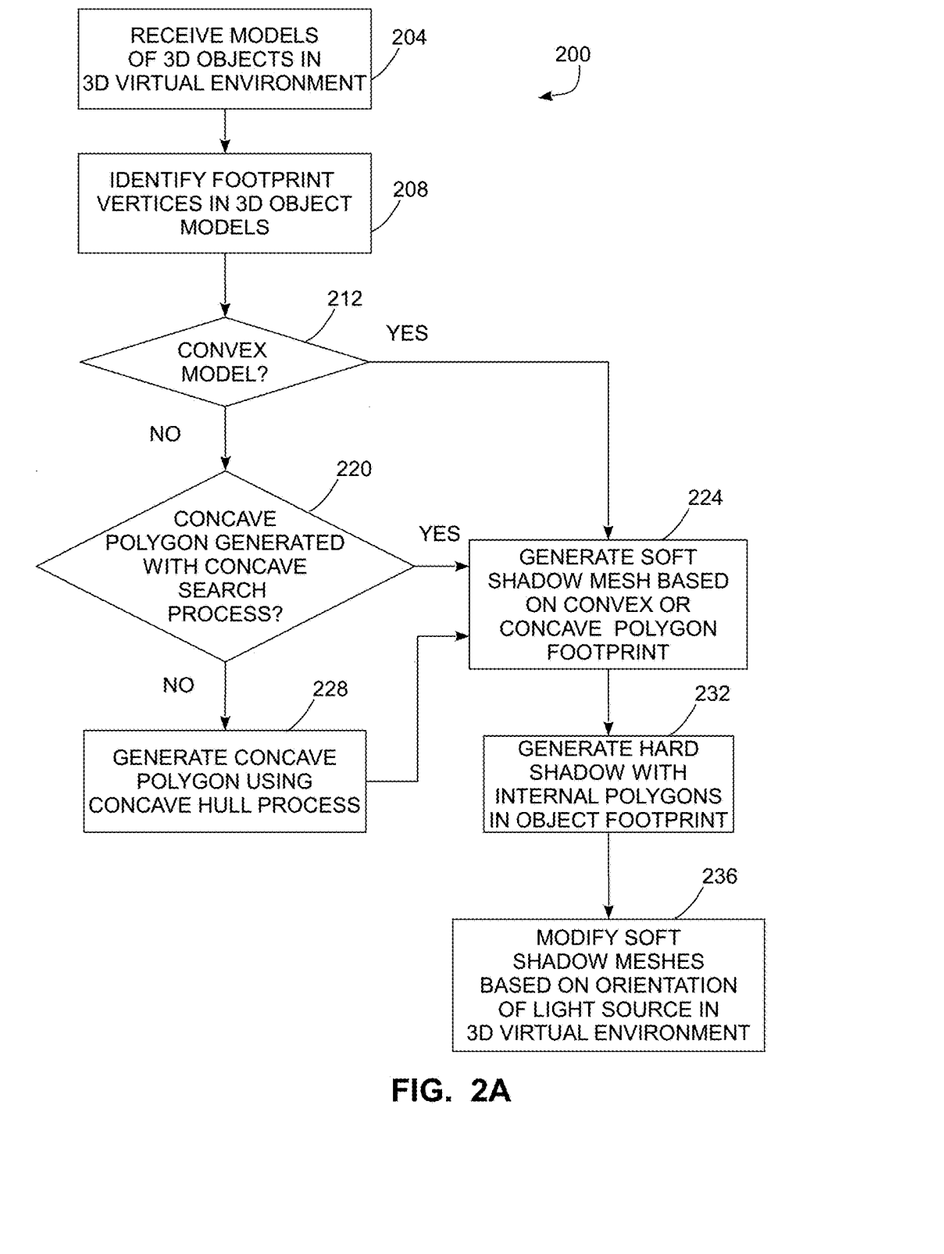
FIG. 2A is a block diagram of a process for generating hard and soft shadows around convex and concave object models in a three-dimensional virtual environment.

FIG. 2A depicts a process 200 for generating a ground lighting or shadow mesh that is displayed around a base of an object, such as model of a building, in a 3D virtual environment. The process 200 generates shadow and light meshes for both convex and concave objects. In one embodiment, the ground lighting mesh is another term that refers to a soft shadow mesh where the computing system 104 applies a ground lighting texture during night conditions instead of the darker soft shadow texture that is applied around the structure during daytime conditions in the three-dimensional virtual environment. In the description below, a reference to the process 200 performing a function or action refers to the operation of one or more controllers or processors that are configured with programmed instructions, which are executed by the controllers or processors to implement the process performing the function or action in conjunction with one or more components in the system 104. The process 200 is described with reference to the computing system 104 of FIG. 1 for illustrative purposes.

The process 200 FIG. 2A generates simulated ground shadow and light effects for 3D models with both convex and concave footprint polygons, however the input 3D model data not necessarily contain footprint data. For the generic input 3D model data which not necessarily contain footprint data, the main challenge is to generate footprint polygon with the balance of accurate and performance. As described in more detail below, the process 200 generates concave polygon footprints using a bread-first search process or, if the breadth-first search process fails, a more complex concave hull process. The search process is a computationally simpler process while the concave hull process is more computationally complex but produces more accurate footprint polygons if the concave polygon search process fails.

During the process 200, the system 104 receives models of 3D objects in a 3D virtual environment (block 204) and the system 104 identifies footprint vertices for the 3D object models (block 208). The processor 108 receives structure model polygon data 128 for objects, such as 3D building structure models, from the memory 120 along with virtual environment data 124. The processor 108 identifies the base vertices in the 3D object model data that intersect with a ground plane or other base in the virtual environment to identify a set of vertices for each object that correspond to the "footprint" of the object in the 3D virtual environment. During process 200, the system 104 identifies convex and concave footprints, and generates ground shadow and lighting effects for both convex and concave objects.

Process 200 continues as the system 104 generates a convex polygon around the vertices in the footprint of the object and identifies if the convex polygon is suitable for generation of the hard and soft shadows, or if the footprint includes vertices that correspond to a concave polygon (block 212). In the system 104, the processor 108 generates a convex polygon using a convex hull generation process that is known to the art.

Figure 2B:
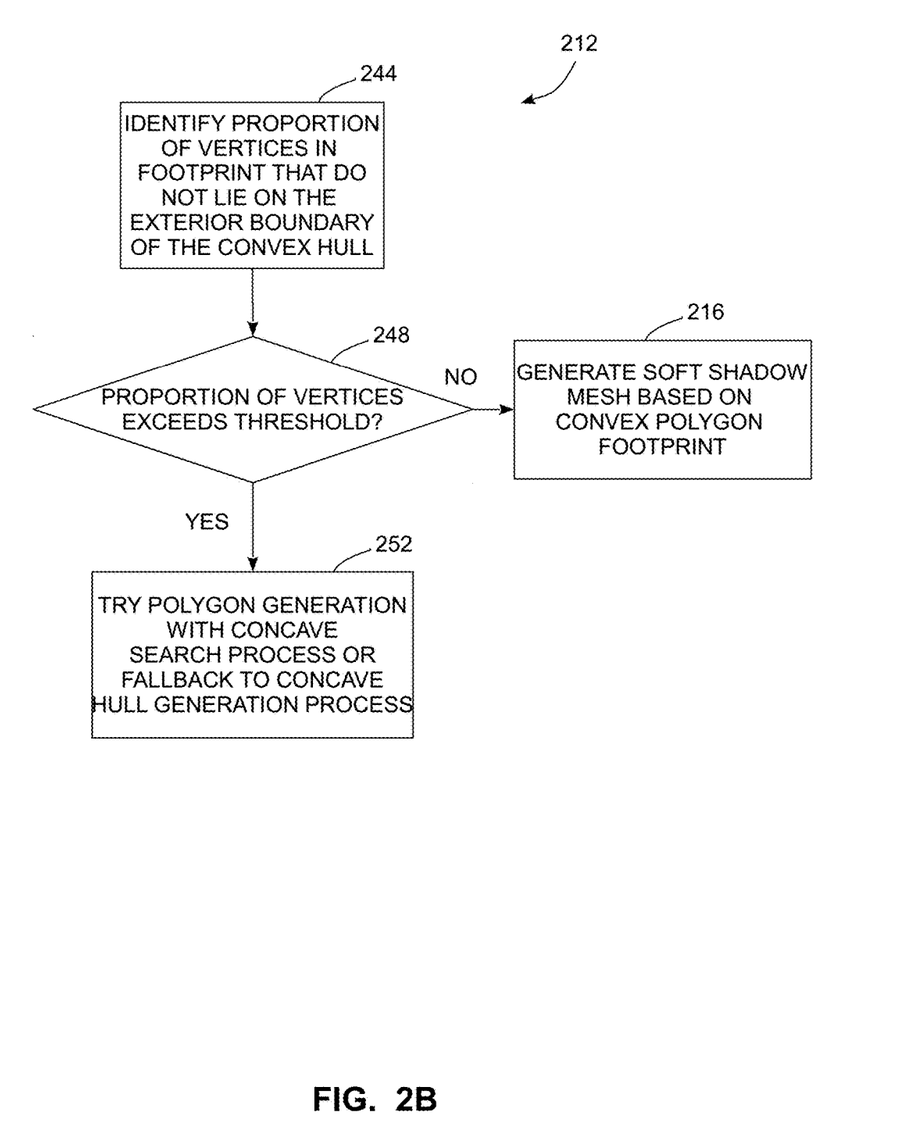
FIG. 2B is a block diagram of a process for identification of convex and concave hull polygons for object footprints that is performed in conjunction with the process of FIG. 2A.

FIG. 2B depicts the identification of a concave polygon in the processing of block 212 in more detail. For each generated convex polygon the process is used to check if the quality is accurate enough for the following process of generating shadow mesh. The percentage of the footprint points which is not in the generated convex hull boundary is used to determine the quality of the generated convex polygon. As depicted in FIG. 2B, the system 104 identifies the proportion p of vertices that do not form the convex hull polygon as: $p = N_f - N_{convex}/N_f$ where $N_f$ is the number of points in the footprints and $N_{convex}$ is the number of points in the generated convex hull (block 244). The processor 108 identifies if the proportion p of vertices exceeds a predetermined threshold (e.g. a proportion of greater than 0.1 (10%) in one embodiment) (block 248). If the percentage exceeds the limit, the test for specified convex polygon is failed and the system 104 returns to the process 200 to generate a concave footprint polygon for the object (block 252). If the proportion of the vertices within the convex polygon is less than the predetermined proportion, the system 104 uses the convex polygon as the footprint polygon for generation of hard and soft shadow meshes (block 216 in FIG. 2B). The cross-reference patent application Ser. No. 13/828,772 includes additional description about the process for generation of soft ground shadow and light meshes for 3D objects having convex footprints.

Figure 2C:
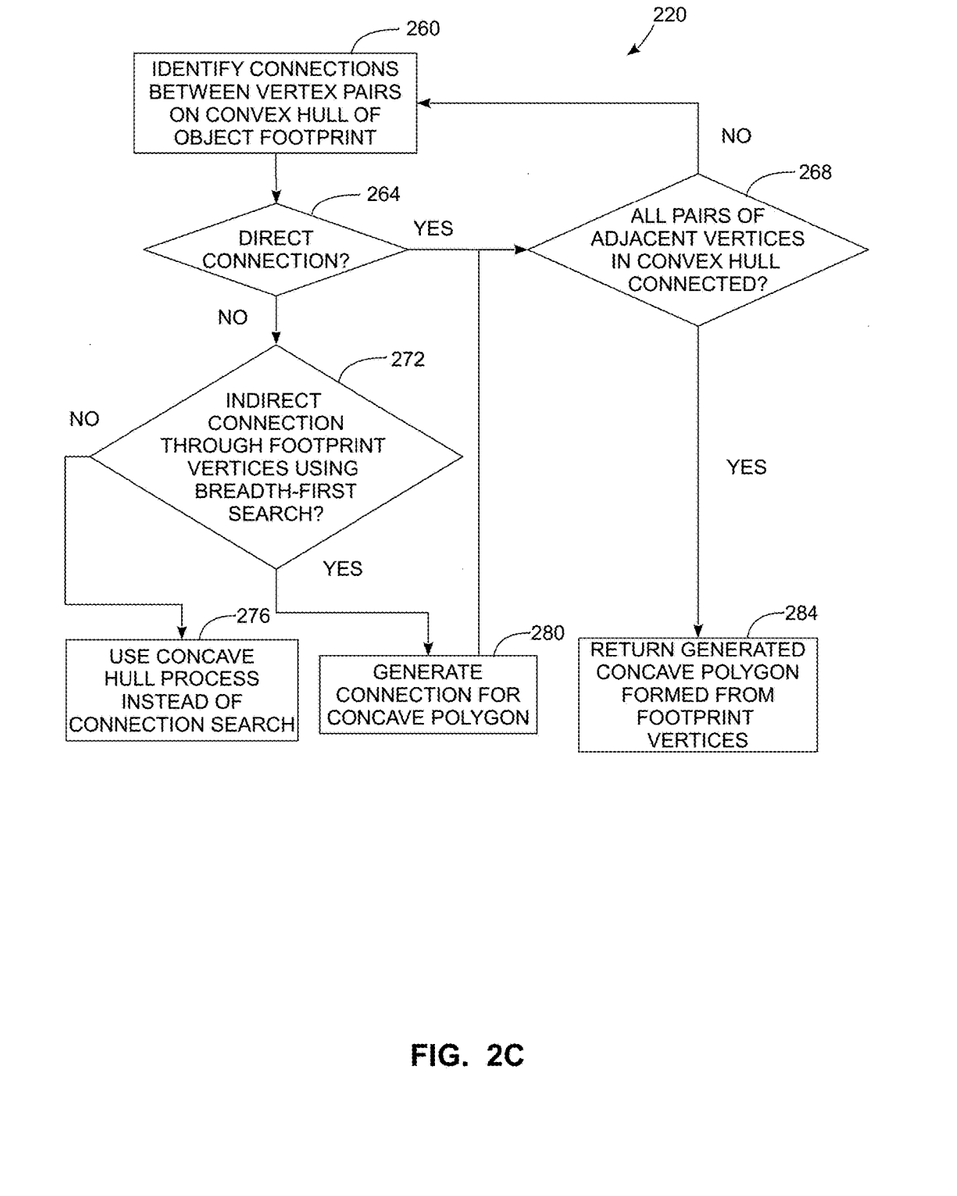
FIG. 2C is a block diagram of a concave hull search process that is performed in conjunction with the process of FIG. 2A.
Figure 3:
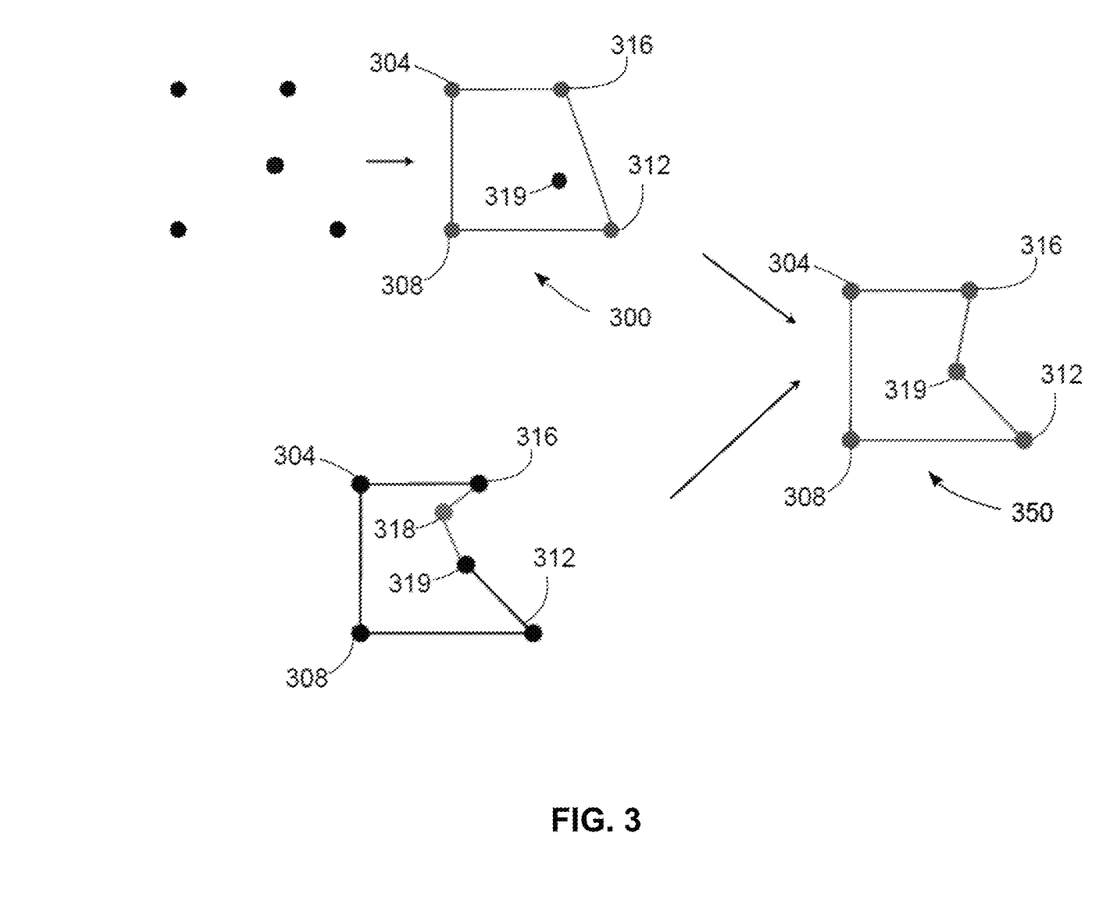
FIG. 3 is a diagram of a set of vertices in the footprint of an object in a 3D virtual environment and generation of a concave polygon from a convex polygon formed around the vertices.
Figure 4:
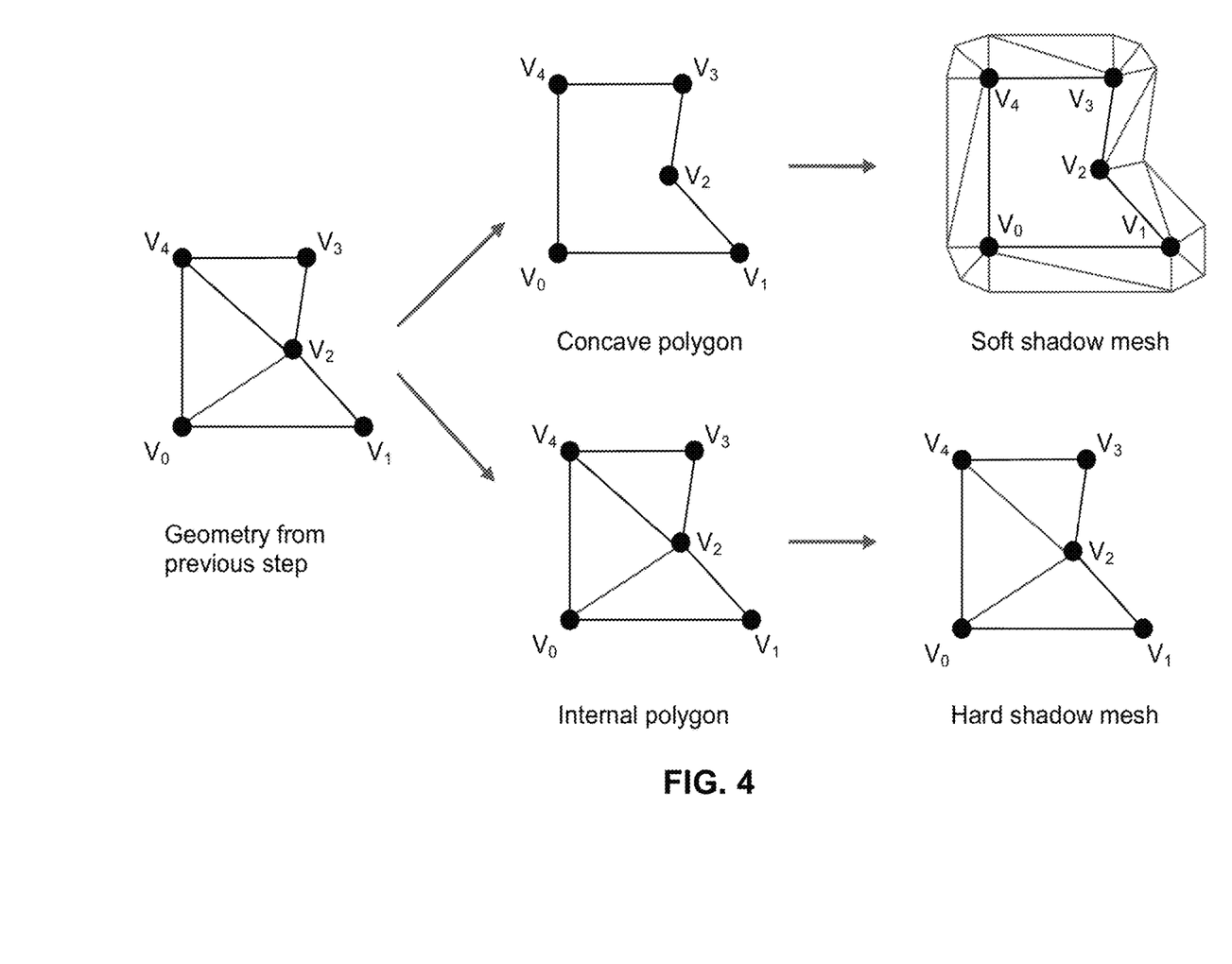
FIG. 4 is a diagram depicting generation of a concave polygon and generation of ground shadow and lighting meshes from the vertices depicted in FIG. 3.

During process 200, the system 104 performs a search process to attempt generation of a concave footprint for the polygon (block 220). The search process is computationally efficient but does not produce an appropriate concave footprint polygon for every possible set of vertices in the building footprint model. FIG. 2C depicts the concave polygon search process of block 220 in more detail. In FIG. 2C, the processor 108 identifies connections between vertex pairs on the convex hull polygon (block 260). For example, FIG. 3 depicts a polygon 300 with five vertices 304, 308, 312, 316, and 319. The vertex 319 lies within a two dimensional region that is formed by the vertices 304-316. The vertices 304-316 form a convex polygon 300. In FIG. 3, the processor 108 identifies the connection between adjacent vertices in a convex polygon 300, such as the vertices 312 and 316.

The processor 108 then identifies if the connection is a direct or indirect connection (block 264). The processor 108 continues processing additional pairs of vertices if the two vertices are directly connected and not all pairs of adjacent vertices in the convex hull have been processed (block 268). If, however, the connection between adjacent vertices is not direct, such as the vertices 312 and 316 in FIG. 3, then the process 200 continues as the processor 108 performs a breadth-first search to identify vertices in the 3D object model data to generate an indirect connection for the footprint polygon (block 272). The processor 108 uses a predetermined depth limit for the breadth-first search to limit the potential computational complexity required to identify indirect vertex pair connections in complex footprint polygons. In the example of FIG. 3, the processor 108 identifies an indirect connection between vertices 312 and 316 through vertices 319 and 318. The processor 108 generates connections between the vertex pairs 312/319 and 319/316 to form a portion of a concave footprint polygon 350 that includes the footprint vertex 319 (block 280). In the example of FIG. 3, another vertex 318 is skipped because it is not a footprint vertex. In some instances, if the indirect connections exceed the depth of the breadth-first search process, the system 104 stops the search process and instead uses a prior art concave hull generation process that is described in more detail below (block 276).

The processor 108 continues processing additional pairs of vertices until all of the pairs of adjacent vertices in the convex hull polygon have been processed to generate the concave footprint polygon that is formed from the footprint vertices (block 284) or if the breadth-first search process fails, to use a concave hull process to generate the concave footprint polygon (block 276).

If the search process described above with reference to the processing of block 220 in FIG. 2C fails to generate the concave footprint polygon, the system 104 performs a prior art concave hull process to generate the footprint polygon (block 228). In one embodiment, the processor 108 generates Delaunay triangulation geometry from the input footprint vertices. The processor 108 then identifies the longest border edge from the remaining border edges and compares the longest edge with a predetermined length threshold (e.g. 10.0 in one embodiment). The processor 108 deletes the longest border edge if the edge exceeds the predetermined length threshold and if deletion of the longest border edge produces no degenerate triangles. The processor 108 repeats the deletion process for all border edges until no border edges meet the criteria listed above. The processor 108 generates the concave polygon using the remaining border edges.

The processor 108 often requires more time to perform the concave hull process compared to the search process described above with reference to FIG. 2C, but the concave hull process enable the processor 108 to generate the concave footprint polygons for 3D object models having footprint vertex arrangements that are unsuitable for use with the vertex search process.

Process 200 continues as the processor 108 generates the soft shadow mesh for the 3D object using the concave or convex footprint polygon (block 224) and generates a hard shadow mesh for the footprint that lies inside of either the concave or convex hull (block 232). FIG. 4, FIG. 5 and FIG. 6A-FIG. 6B illustrate the generation of shadow meshes for concave and convex footprint polygons that correspond to objects in the 3D virtual environment. The processor 108 generates both hard shadow and soft shadow meshes for the footprint polygons. The processor 108 offsets the edges of the convex or concave footprint polygon outward to generate the soft shadow mesh. In one embodiment, the processor 108 generates the soft shadow mesh for a concave polygon in O(n) time by looping through each edge of the concave polygon. The cross-reference patent application Ser. No. 13/828,772 includes description about the process for generation of hard shadow mesh for convex footprint polygon. The hard shadow generation for concave footprint polygon that is formed from the footprint vertices using vertex search process (block 284) is skipped because it is occluded by the building walls. The processor 108 generates the hard shadow mesh for concave footprint polygon that is generated from concave hull process using the internal triangles of the geometry output for the footprint polygon.

Figure 5:
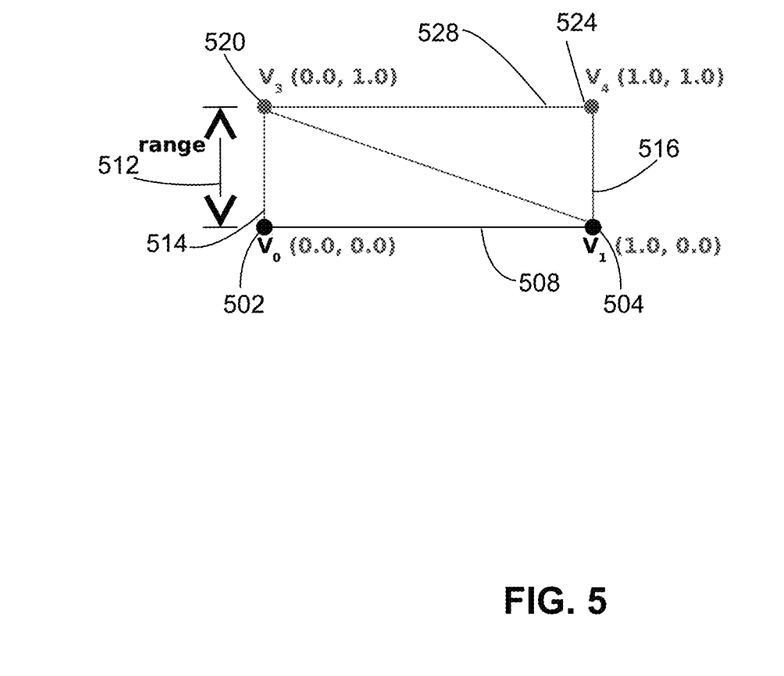
FIG. 5 is a diagram depicting a first section of a ground shadow mesh that extends from a single edge of a polygon.

FIG. 5 depicts two sides 508 and 620 of a polygon corresponding to the base of a structure in the 3D virtual environment and a polygon mesh 528 that extends outwardly from the side 508 along with mesh elements 644 and 648 that extend from a corner vertex 504. The illustrative example of FIG. 5 depicts a convex portion of a polygon that is part of either a convex hull polygon or a convex portion of a concave hull polygon. The side 508 includes two edges with co-linear vertices 502 to 504 and 504 to 624 that form a portion of a concave hull or convex hull generated during the process 200. The remainder of the convex polygon is omitted from FIG. 5 for clarity. During the soft shadow mesh generation in process 200, the processor 108 generates a rectangle using the side 508 that extends between convex polygon vertices 502 and 504 as one side of the rectangle. The processor 108 generates the rectangle with sides 514 and 516 that have a predetermined length corresponding to a predetermined range 512. The processor 108 also generates corner triangles 644 and 648 including soft shadow mesh vertices 628 and 632 around a corner at vertex 504. The edge 636 between vertices 504 and 632 forms one side of another rectangle in the shadow mesh (not shown) that extends from the side 620 in a similar manner to the polygon mesh 528.

In FIG. 5, the soft shadow mesh extends a predetermined distance (range 512) from the sides of the concave or convex hull polygon. The predetermined range 512 provides a uniform distance for the soft-shadow mesh to extend outwardly from the structure on all sides of the structure. As described in more detail below, in some configurations the processor 108 modifies the positions of some vertices in the soft shadow mesh to adjust the size and shape of different portions of the shadow mesh to account for the position of an illumination source in the three-dimensional virtual environment. The processor 108 tessellates the rectangle to form the soft shadow mesh 528 with a first triangle that is formed by vertices 502, 504, and 520, and a second triangle that is formed by vertices 504, 520, and 524.

Figure 6A:
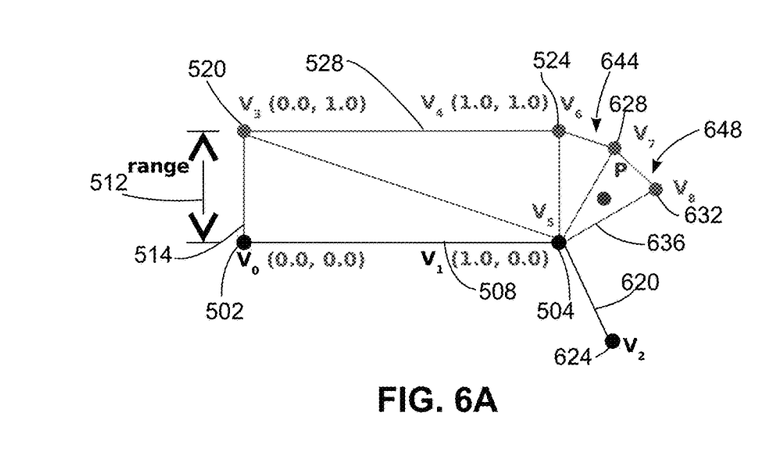
FIG. 6A is a diagram depicting a second section of a ground shadow mesh that extends from a vertex of a convex polygon.

FIG. 6A depicts generation of triangles for the soft-shadow mesh around a corner of the concave hull or convex hull polygon. In FIG. 6A, the vertices 504 and 624 form another side 620 of the convex polygon. The angle between the two sides is subdivided into a plurality of triangles with the example of FIG. 6A including two triangles, while alternative embodiments use either a single triangle or a larger number of triangles to subdivide the angle. In FIG. 6A, one triangle is defined by the vertices 504, 524, and 628, and the other triangle being defined by vertices 504, 628, and 632. The sides of the triangles that project outward from the vertex 504, such as side 636, each have the same length as the range 512 and the sides of the rectangle that form the mesh 528.

Figure 6B:
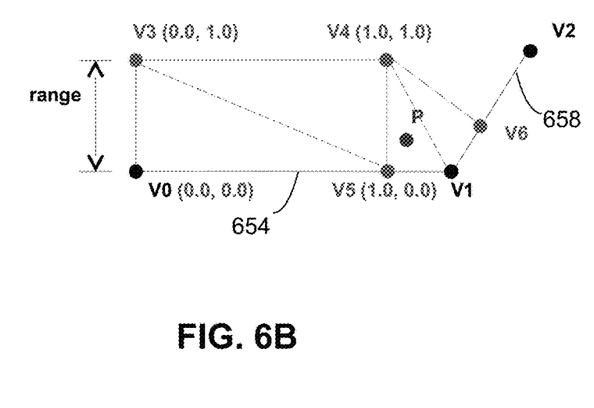
FIG. 6B is a diagram depicting a second section of a ground shadow mesh that extends from a vertex of a concave polygon.

The processor 108 generates the soft shadow mesh from edges based on the angle between two adjacent edges. The cross-reference patent application Ser. No. 13/828,772 includes description about the process for generation of soft shadow mesh from edges if the angle between two edges is equal to or greater than 180°. FIG. 6B depicts the soft shadow mesh generation if the angle between two edges is less than 180°. The configuration of FIG. 6B shows a specific instance of a portion of a concave hull polygon. As illustrated in FIG. 6B, the processor 108 generates a soft shadow mesh from four triangles ($V_0V_5V_3$, $V_5V_4V_3$, $V_1V_4V_5$ and $V_1V_6V_4$) for the edges 654 and 658. The texture coordinates for triangles ($V_0V_5V_3$, $V_5V_4V_3$) are illustrated in FIG. 6B. In one embodiment, the processor 108 identifies texture coordinates for triangles around the corner ($V_1V_4V_5$, $V_1V_6V_4$) during generation of the 3D virtual environment display with the GPU 116 using a programmable shader in the GPU 116. With the calculated texture coordinates, the system applies different shadow textures to generate stylized soft shadows effects for 3D city model with concave footprint polygon. In one embodiment, one or more shader hardware units in a GPU of the processor 108 execute a fragment shader program to apply textures to the soft shadow mesh. The processor 108 identifies texture coordinates in a two-dimensional uv plane using the following equations for texture coordinates of the point P in the corner triangle of the shadow mesh:

$$u = \frac{\text{angle}(\angle V_5 V_4 P)}{\text{angle}(\angle V_5 V_4 V_6)}$$

$$v = \max\left(1.0 - \frac{\text{length}(V_4 P)}{\text{range}}, 0.0\right)$$

Figure 8:
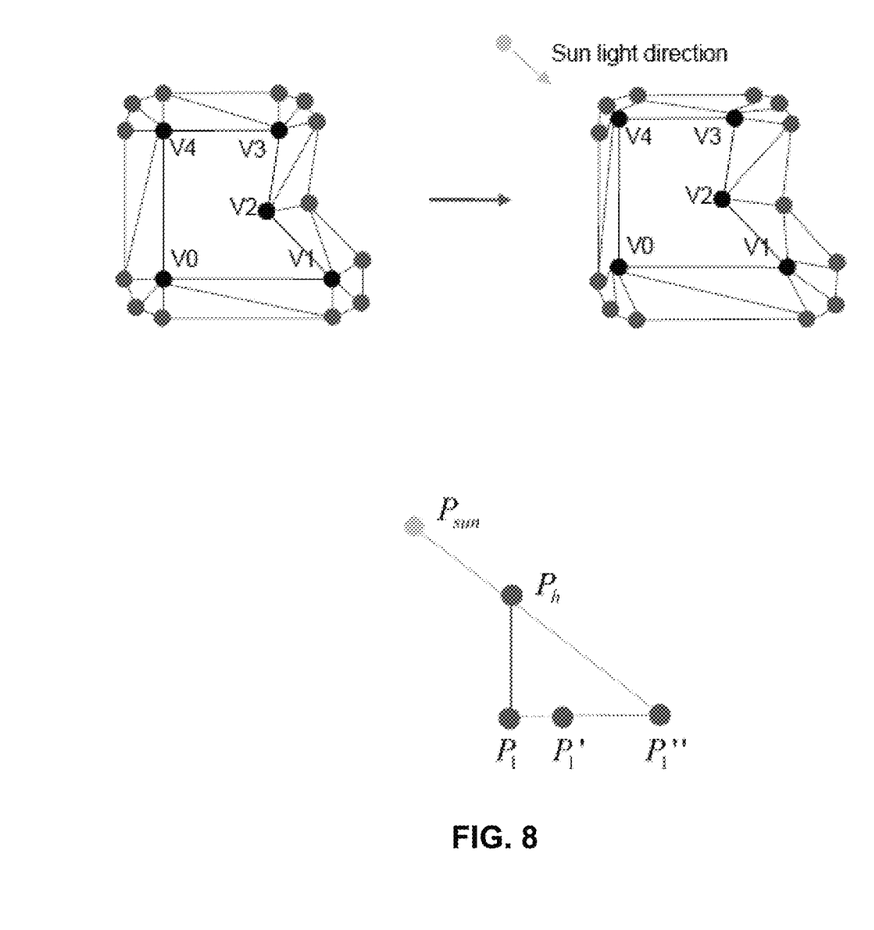
FIG. 8 is a diagram that depicts deformation of a soft shadow mesh based on a position of a light source in a 3D virtual environment to enable simulated soft shadow generation in the presence of the light source.

Referring again to FIG. 2A, in some configurations of the process 200, the system 104 modifies the location of at least one vertex in the soft shadow meshes for one or more of the objects in the 3D virtual environment based on the location of an illumination source, such as the sun, in the 3D virtual environment (block 236). In some embodiments, the shape of the shadow mesh is modified prior to applying the lighting or ground shadow texture. In one embodiment, one or more shader hardware units in a GPU of the processor 108 execute a vertex shader program to displace the vertices in the soft shadow mesh to change the shape of the soft shadow mesh to account for the position of the illumination source. The system 104 modifies the locations of vertices in the soft shadow meshes based on the location of the illumination source to provide more realistic ground shadow effects. For example, the processor 108 modifies the shadow meshes based on the sized and shapes of shadows that the structures in the 3D virtual environment cast as an illumination source corresponding to the sun changes an apparent position at different times of day. FIG. 8 illustrates the process of soft shadow deformation based on the location of an illumination source, such as the sun in 3D virtual environment. In FIG. 8, $P_{sun}$ is the position of the sun, $P_1$ is one vertex of the soft shadow mesh, $P_h$ is a virtual point that is vertical to $P_1$ and the distance between $P_1$ and $P_h$ is the average building height. The point $P_h$ corresponds to a head of a mesh center. $P_1'$ is the projected soft shadow point when sun position is located directly over the head of the mesh center $P_h$, and $P_1''$ is the project soft shadow point when sun is not directly overhead the point $P_h$, such as in the position depicted in FIG. 8. The processor 108 estimates an offset length between $P_1''$ and $P_1'$ using the following equations:

$$V_{normal} = \frac{P_h - P_1}{\|P_h - P_1\|},$$

$$V_{sun} = \frac{P_{sun}}{\|P_{sun}\|},$$

$$f_{clamp}(x) = \max(\min(x, 1.0), 0.0),$$

$$V_{p_1'', p_1'} = V_{sun} \times V_{normal} \times f_{clamp}(V_{sun} \cdot V_{normal}) \times h \times S_{scale}$$

where h is the average height of the mesh and $S_{scale}$ is a predetermined scaling factor that the processor 108 uses to adjust the offset range of the soft shadow for the specified sun position.

To generate a display of the virtual environment with the display device 144, the processor 108 places the hard and soft shadow meshes over surfaces in the virtual environment to enable display of the shadows. In some embodiments, the shadow and highlight textures are partially transparent to enable partial visibility of the underlying surfaces in the virtual environment. Additionally, some embodiment of the shadow and highlight textures are formed with a gradient where the intensity of the texture is greatest at a location that is proximate to the structure in the shadow mesh and where the intensity gradually dissipates as the shadow mesh extends away from the structure. In one embodiment, the processor 108 applies the shadow or highlight texture to the corner triangles in the soft-shadow mesh, such as the meshes depicted in FIG. 6B with the modifications that are depicted in FIG. 8. Each pixel P in the triangles of the shadow mesh receives a mapped texture coordinate from the shadow mesh. The texture mapping enables generation of a uniform shadow or highlight extending from the structure in the display of the virtual environment. In the computing system 104, one or more fragment shader units, which are also referred to as pixel shaders, in the GPU 116 perform the shadow or texture mapping process in an efficient manner.

Figure 9:
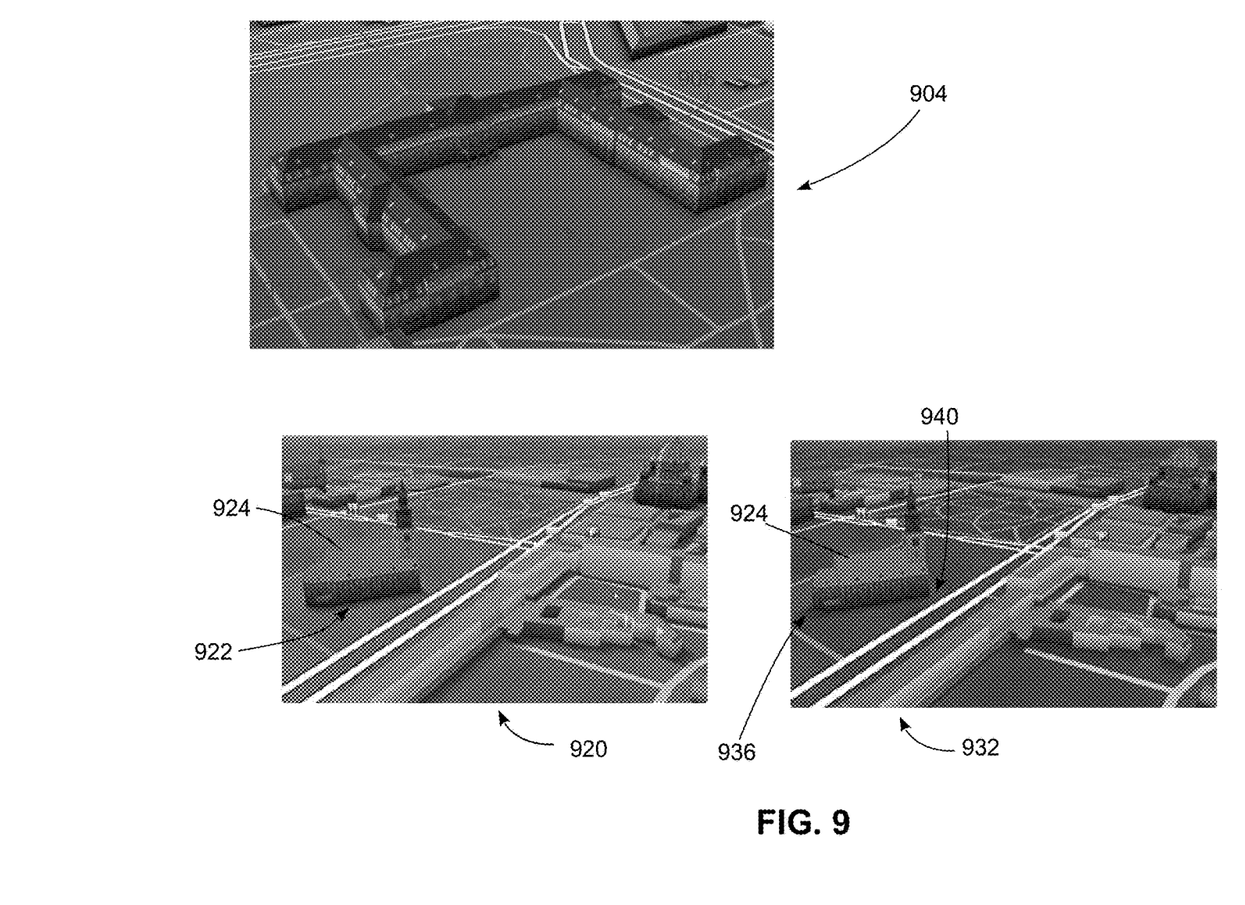
FIG. 9 is a diagram of a 3D virtual environment that is generated using the shadow generation technique of FIG. 7A.

FIG. 9 depicts a view 904 of the 3D virtual environment including a building structure model 906 that has a concave footprint and ground shadows that the system 104 generates using the process 200 instead of the prior art shadow generation processes. As depicted in the view 904, the regions of the ground 908 and 910 are not completely covered with the ground shadow (or lighting) texture. Instead, the system 104 generates a concave footprint polygon that corresponds to the footprint of the building model 906 to generate a ground effect shadow mesh that properly corresponds to the exterior of the building model 906. FIG. 9 also depicts views 920 and 932 that depict the modification of ground shadow meshes corresponding to the orientation of a light source in the 3D virtual environment. For example, the view 920 depicts the 3D virtual environment during daytime when an illumination source corresponding to the sun is located high in the sky of the virtual environment to generate comparatively short and uniform ground effect shadow, such as the shadow 922 by the building 924. The view 932 depicts the same portion of the 3D virtual environment when the light source is closer to the horizon of the ground plane, such as near dawn or dusk. The orientation of the illumination source generates ground effect shadows that are shorter for faces of the objects that are exposed to the illumination source and longer for faces of the objects that are occluded from the illumination source. For example, in view 932 the system 104 modifies the ground shadow mesh to generate an elongated ground shadow for the building structure 924 in region 936 while reducing the size of the ground shadow in the region 940 to depict the ground shadow that the building structure 924 casts when the sun is low in the sky in the 3D virtual environment. In FIG. 9, the processor 108 applies a ground shadow texture to the soft shadow mesh that extends on the ground surface from the base of the structure of the building 924. In another configuration where the building is depicted at night, the processor 108 applies a ground lighting texture to the soft shadow mesh, which is interchangeably referred to as a ground lighting mesh, to produce a ground lighting visual effect around the building in a night time environment.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for generating computer graphics with soft shadow effects comprising:
   identifying with a processor a plurality of vertices in a footprint of a structure in a three-dimensional virtual environment;
   generating with the processor a concave hull including the plurality of vertices in the footprint of the structure, the generation of the concave hull further comprising:
      identifying with the processor a first vertex and a second vertex in the plurality of vertices located on a convex hull formed around the plurality of vertices in the footprint;
      performing with the processor a breadth-first search to identify a third vertex in the plurality of vertices located between the first vertex and the second vertex and not located on the convex hull; and
      generating with the processor the concave hull including the first vertex, the second vertex, and the third vertex;
   generating with the processor a soft shadow mesh extending outward from each vertex in the concave hull onto a surface in the three-dimensional virtual environment from a base of the structure;
   applying with the processor a lighting texture to the soft shadow mesh; and
   generating with the processor and a display device a depiction of the structure and the soft shadow mesh with the applied lighting texture in the three-dimensional virtual environment.

2. The method of claim 1 further comprising:
   prior to generating the concave hull, generating with the processor a convex hull for the structure with reference to a first portion of the plurality vertices in the footprint;
   identifying with the processor a proportion of the plurality of vertices in the footprint that are not included in the first portion of vertices in the convex hull; and
   generating with the processor the concave hull in response to the proportion exceeding a predetermined threshold ratio.

3. The method of claim 1, the generation of the concave hull further comprising:
   performing the breadth-first search with a predetermined depth limit.

4. The method of claim 1, the generation of the soft shadow mesh further comprising:
   identifying with the processor an average height of the structure above the surface with reference to polygon data for the structure stored in a memory;
   identifying with the processor a position of an illumination source in the three-dimensional virtual environment; and
   modifying with the processor a location of at least one vertex in the soft shadow mesh with reference to the average height of the structure and the position of the illumination source.

5. The method of claim 4, the modifying of the location of the at least one vertex in the soft shadow mesh further comprising:
   executing a vertex shader program with at least one shader unit in the processor to modify the location of the at least one vertex in the soft shadow mesh.

6. The method of claim 1, the applying of the lighting texture further comprising:
   executing a fragment shader program with at least one shader unit in the processor to apply a ground lighting texture to the soft shadow mesh.

7. The method of claim 1, the applying of the lighting texture further comprising:
   executing a fragment shader program with at least one shader unit in the processor to apply a shadow texture to the soft shadow mesh.

8. The method of claim 1 further comprising:
   applying with the processor a hard shadow to a region inside the concave hull.

9. The method of claim 1 wherein the structure is a model of a building in the three-dimensional virtual environment.

10. A graphical display system comprising:
   a display device;
   a memory; and
   a processor operatively connected to the display device and the memory, the processor being configured to:
      identify a plurality of vertices in a footprint of a structure in a three-dimensional virtual environment with reference to polygon data stored in the memory;
      generate a concave hull including the plurality of vertices in the footprint of the structure, the processor being further configured to:
         identify a first vertex and a second vertex in the plurality of vertices located on a convex hull formed around the plurality of vertices in the footprint;
         perform a breadth-first search to identify a third vertex in the plurality of vertices located between the first vertex and the second vertex and not located on the convex hull; and
         generate the concave hull including the first vertex, the second vertex, and the third vertex;
      generate a soft shadow mesh extending outward from each vertex in the concave hull onto a surface in the three-dimensional virtual environment from a base of the structure;
      apply a lighting texture stored in the memory to the soft shadow mesh; and
      generate a depiction of the structure and the soft shadow mesh with the applied lighting texture in the three-dimensional virtual environment using the display device.

* * * * *